J. D. ALLEN.
COMPENSATING REVERSIBLE DRIVING MECHANISM.
APPLICATION FILED OCT. 3, 1916.
1,264,744.  Patented Apr. 30, 1918.
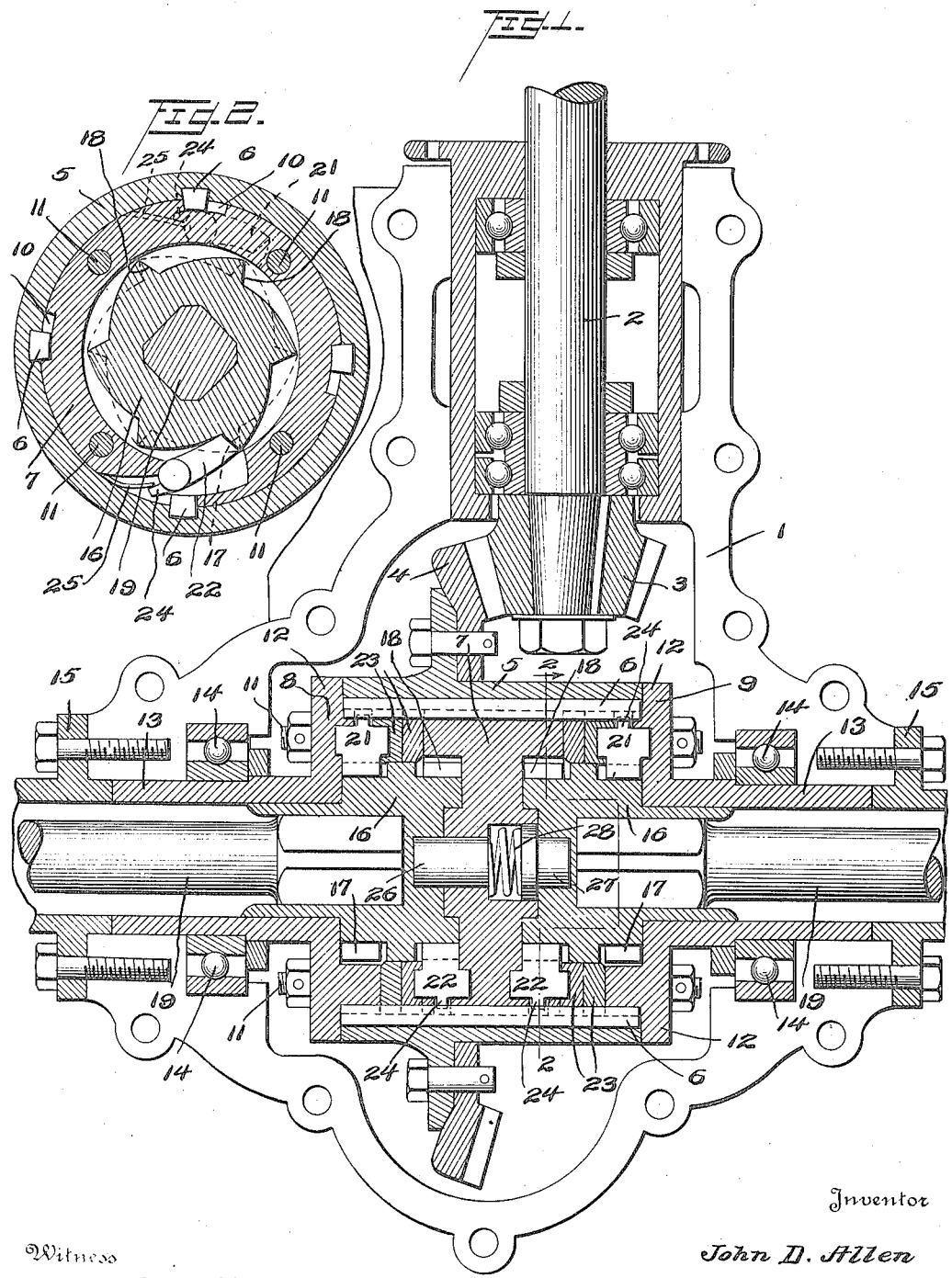
Inventor
John D. Allen
By Howard A. Coombs
his Attorney
Witness
Harold Strauss

UNITED STATES PATENT OFFICE.

JOHN D. ALLEN, OF PHILADELPHIA, PENNSYLVANIA.

COMPENSATING REVERSIBLE DRIVING MECHANISM.

1,264,744.   Specification of Letters Patent.   Patented Apr. 30, 1918.

Application filed October 3, 1916. Serial No. 123,474.

*To all whom it may concern:*

Be it known that I, JOHN D. ALLEN, a citizen of the United States, residing at Philadelphia, in the county of Philadelphia and State of Pennsylvania, have invented new and useful Improvements in Compensating Reversible Driving Mechanism, of which the following is a specification.

The present invention relates to a driving mechanism, especially adapted for, but not necessarily limited to, use in motor vehicles, and its object is to provide means for the transmission of power from a motor through a hollow shaft to a divided shaft, or two independent alined shafts, in either direction and in such a way that either of the driven shafts is free to rotate faster than the driving shaft.

As applied to motor vehicles, the mechanism, which constitutes this invention, supplants the differential gear in common use, and eliminates the disadvantages of the latter, in that each wheel is driven independently and consequently has no reactive effect on the other when turning faster, whereby all danger of side or circular skidding is avoided, since the propelling power is transmitted only through that wheel which is turning slower when the vehicle is traveling in a curved path. Other advantages of this mechanism, which is a modification of that covered by my Patent No. 1,238,730, will appear from the detailed description which follows, taken in connection with the accompanying drawing, in which—

Figure 1 is a central horizontal section through the rear axle of a motor vehicle, equipped with my invention, and Fig. 2 is a cross-section taken on line 2—2 of Fig. 1.

In these views, 1 represents the lower half of the casing, which constitutes part of the fixed rear axle of the vehicle, 2 is the power shaft, 3 the driving pinion thereon, and 4 the main driving gear in mesh therewith.

The hub of the driving gear is in the form of a sleeve 5, carrying four internal keys 6, and mounted on a central hollow transmission member or driving shaft, composed of three parts 7, 8 and 9, peripherally slotted to receive said keys, the slots 10 being of a greater width than the latter, so that the keys have a limited play therein. In other words, when the gear 4 is driving said transmission member 7, 8, 9 forwardly, the keys abut against one side of said slots, and when the gear is reversed, it drives said member in the other direction, by the keys abutting the other side of said slots.

The three parts, 7, 8, 9 of the transmission member are held together by through bolts 11, and the outer parts, 8 and 9, have flanges 12,—between which the hub 5 is confined,—and tubular extensions 13, journaled in the casing by ball bearings 14 and abutting against the ends of the tubular members 15, which constitute, with said casing, the rigid rear axle of the vehicle.

Journaled within said tubular extensions 13 and on bosses formed on the central part 7 of the transmission member, are two driven members or shafts 16, each having two sets of oppositely facing ratchet teeth, 17, 18; said members being non-rotatably connected to the stub-shafts, or floating axles 19 of the vehicle wheels, preferably by receiving the squared ends of said shafts in similarly shaped sockets formed in said members.

Between each of the end parts 8 and 9, and the center part 7, of the transmission member or driving shaft, are pivotally mounted four pawls. In practice, there will be eight, two for each ratchet, but as the operation is the same, I have confined this description and illustration to four, one for each ratchet, in order to avoid confusion. Two of these, 21, engage the teeth 17, and the other two, 22, engage the oppositely facing set of teeth 18. For convenience of construction and to enable the parts to be assembled, plates 23 are interposed between the outer faces of part 7 and the inner faces of parts 8 and 9, said plates being rigidly secured to said parts by the bolts 11, and, of course, being also slotted at 10 to receive the keys 6. The tails 24 of all said pawls lie in position to be engaged by the keys 6 in the hub 5, so that they are swung out of engagement with the corresponding ratchet teeth by said keys when the hub turns on the transmission member in one direction, and drop into engagement with said teeth when said hub and keys move in the other direction on said member. Springs 25 may be used to insure the reëngagement of the pawls. 26 and 27 represent center steady pins, seated in bores formed in the central member 7 and ratchet wheels 16, respectively, and 28 a coil spring placed between said pins and serving to prevent any tendency of the wheels 16 to stick on the bosses of part 7.

It will now be seen that one pair of pawls (or sets of pawls) only can be in engagement with the corresponding pair of ratchet teeth, no matter which way the driving mechanism is turning, the other pair being automatically raised out of engagement with the other ratchet teeth by the reversal of the driving gear, whereby either vehicle wheel, while being always positively driven, forward or backward, is yet free to overrun when the vehicle is on a curve.

What I claim is:

1. A compensating driving mechanism for motor vehicles, comprising the combination of a reversible driving gear, a plurality of keys in the hub of the same, a three-part transmission member on which said gear is mounted, said member being slotted to receive said keys, the width of the slots being greater than the thickness of the keys, so that the gear has a limited turning movement on said member, two sets of pawls facing in opposite directions secured between the central part of said member and each of the outer parts, two ratchet wheel members journaled on opposite sides of said central part, and alined wheel shafts non-rotatably secured to said ratchet wheel members, each of the latter having two sets of oppositely facing teeth in position to be engaged by the said sets of pawls, respectively, the tails of all the pawls projecting into the slots of said transmission member in position to be engaged by said keys, whereby the pawls facing one way are raised by one edge of said keys when the gear is turning forwardly, and those facing the other way are raised by the other edge of said keys when the gear is turning backwardly.

2. A compensating driving mechanism for motor vehicles, comprising the combination of a hollow driving shaft adapted to be supported between and in alinement with the wheel shafts of the vehicle, two driven members journaled within said shaft and adapted to be connected to said wheel shafts, two sets of oppositely facing ratchet teeth on each of said driven members, four sets of pawls carried by said driving shaft in position to engage said teeth, a gear having internal projections mounted on said driving shaft, the latter having slots to receive said projections, the slots being wider than the latter so as to permit a limited angular movement of said gear on the shaft, and tails on said pawls adapted to be engaged by said keys, whereby two sets of pawls are always held out of engagement.

3. In a reversible driving mechanism, the combination of a driving shaft consisting of a central member, comprising a hub, a web and a rim, and two lateral tubular members having flanges bolted to said rim, said rim having transverse slots, a gear on said rim having internal keys projecting into said slots, the latter being wider than the keys so that the gear has a limited angular movement on the shaft, a driven member journaled in each of said tubular members and on said hub and adapted to be connected to the load, ratchet teeth on said driven members, and oppositely facing pawls journaled in said central member and said lateral members in position to engage said teeth, said pawls having tails engaging said keys, whereby the latter lift the pawls facing one way out of engagement while permitting those facing the other way to engage the teeth.

4. In a driving mechanism for motor vehicles, the combination of a driving shell or casing composed of two parts capable of a limited relative angular movement, oppositely facing pawls carried by one of said parts, means to swing said pawls on their pivots carried by the other of said parts, a pair of driven shafts rotatably mounted within said shell or casing and having means of attachment to the wheel shafts, ratchet teeth on said driven shafts in position to be engaged by said pawls, and springs to throw said pawls into engagement with said teeth, whereby the pawls facing in one direction are held out of engagement and those facing in the other direction are held in engagement, according to the angular position of one part of the driving shell or casing relative to the other part.

In testimony whereof I have hereunto set my hand.

JOHN D. ALLEN.

Witnesses:
ELIZABETH DEDEKER,
C. HARRISON LUND.